Oct. 24, 1950          J. R. THOMAS          2,526,914
GEAR TYPE VARIABLE SPEED HYDRAULIC CLUTCH
Filed Dec. 23, 1946          6 Sheets-Sheet 2
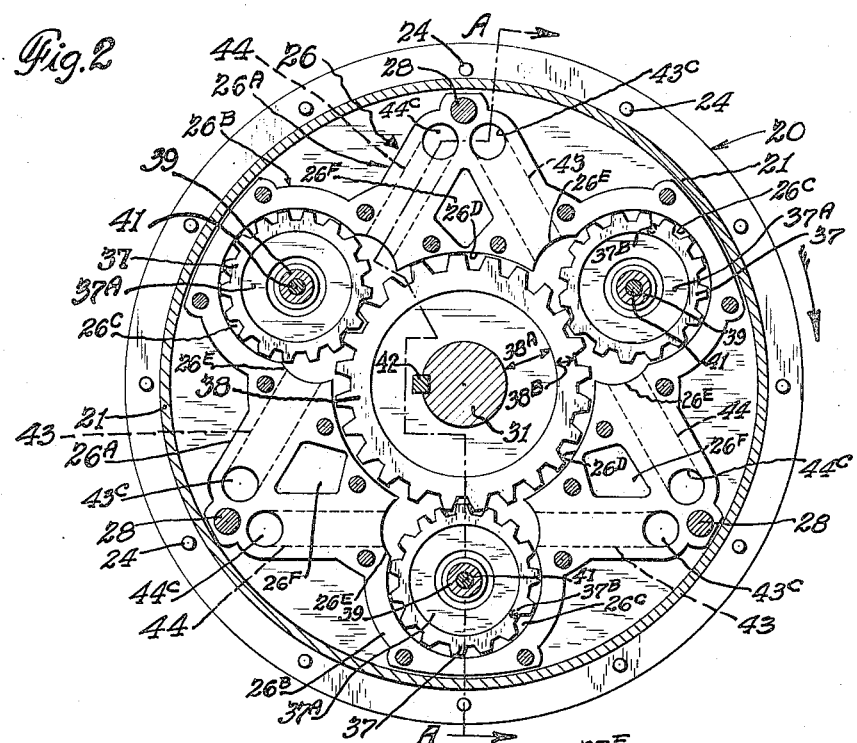
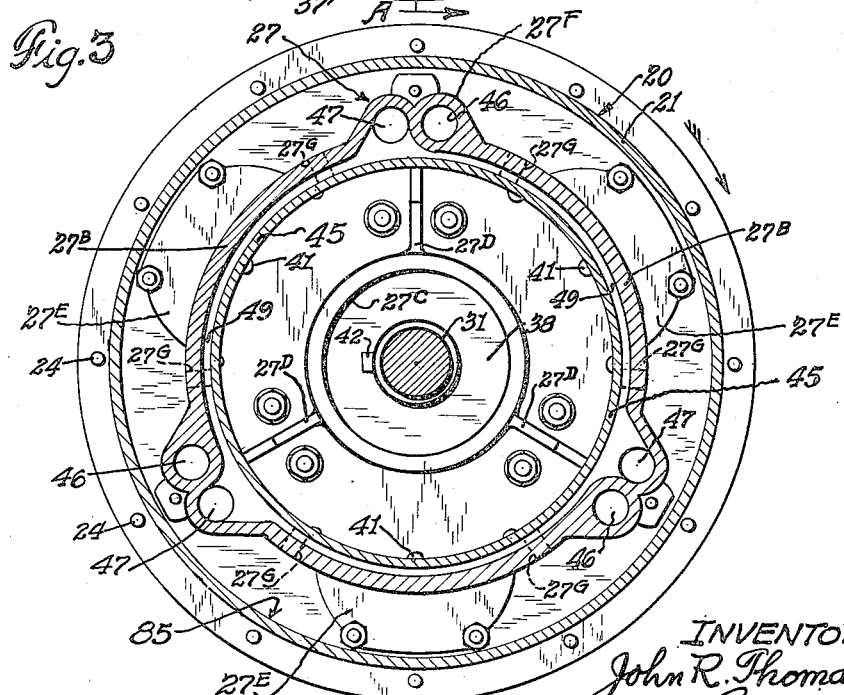
INVENTOR
John R. Thomas
By Frank J. Schraeder Jr.
Attorney

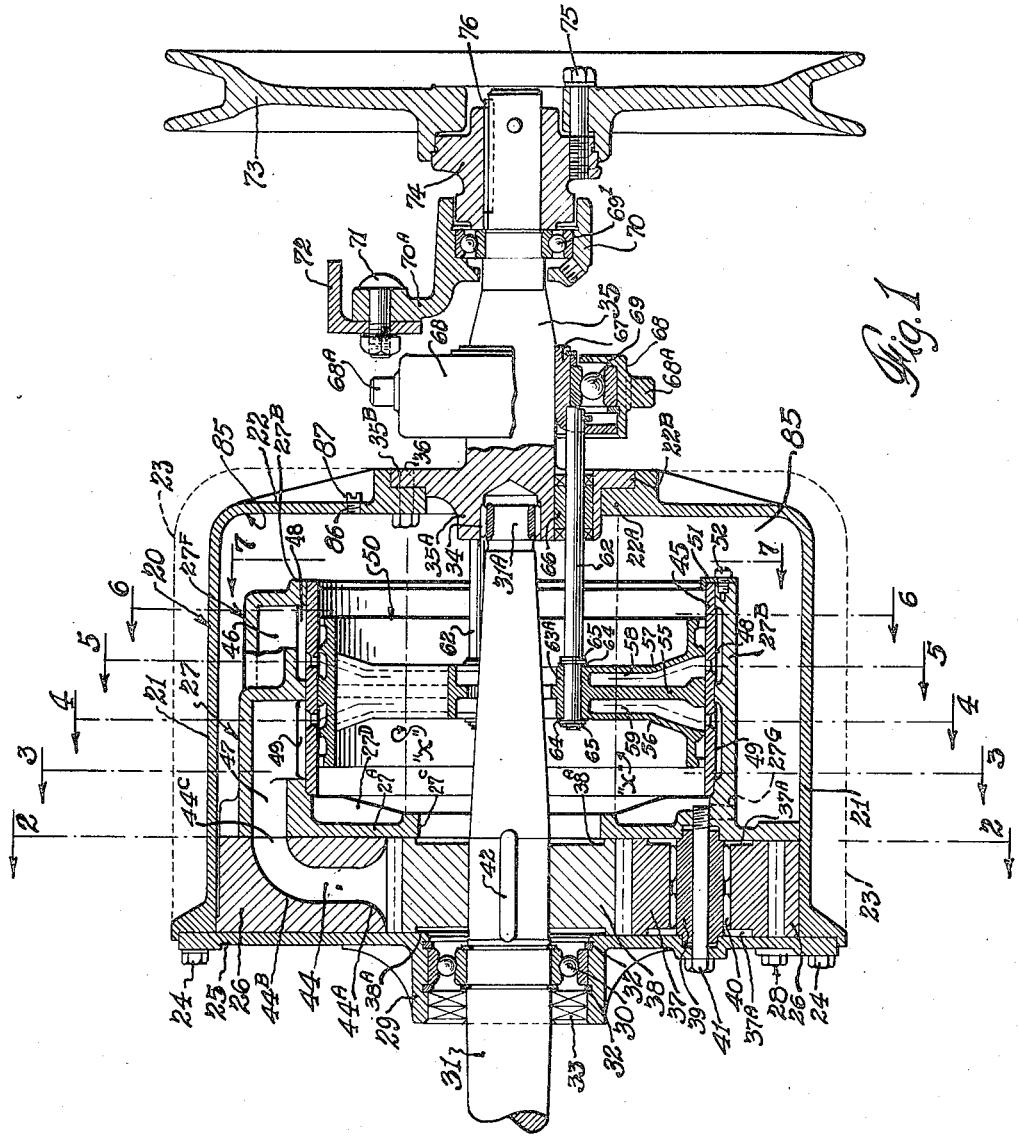

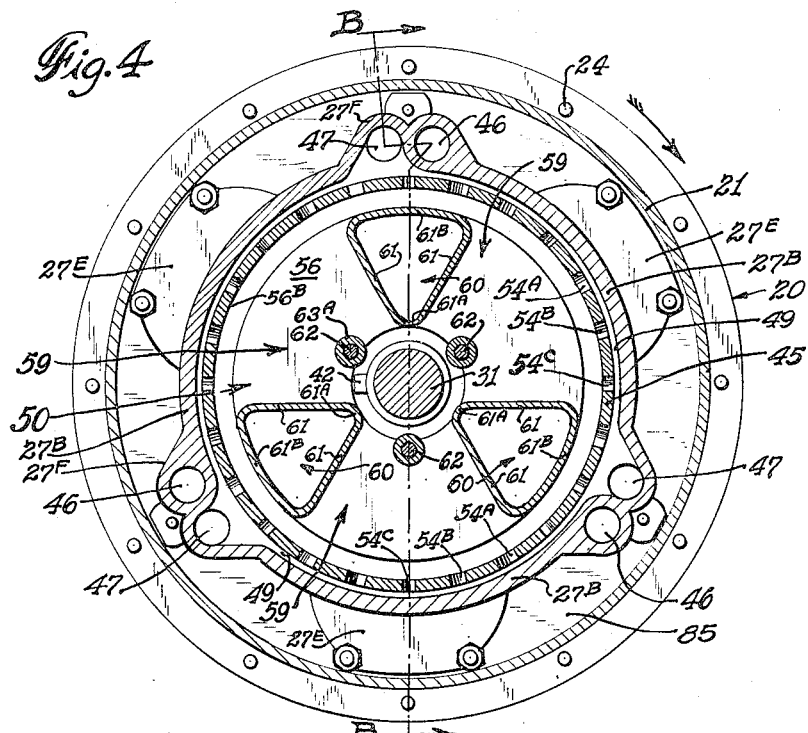
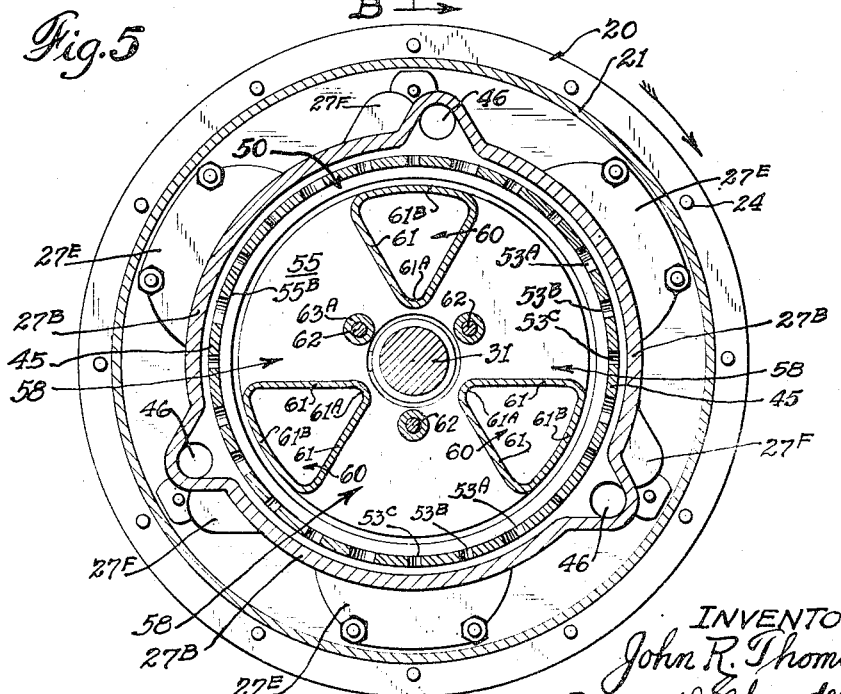

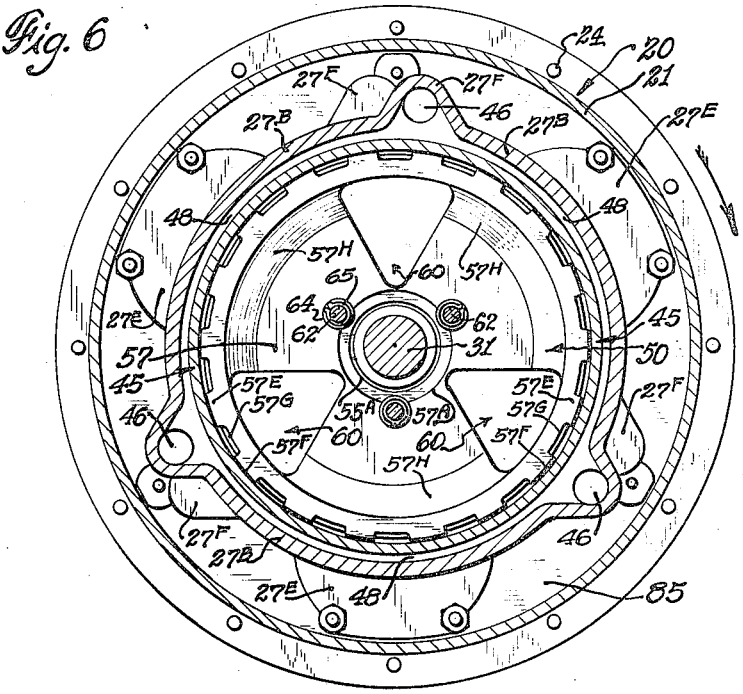
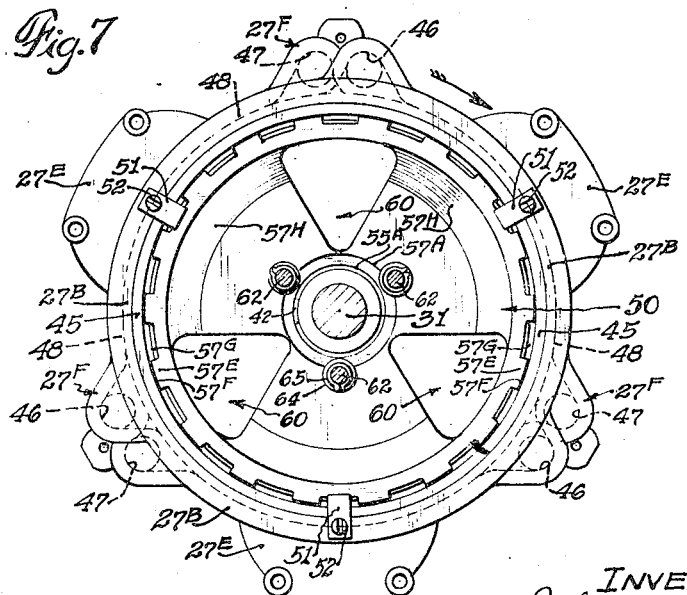

Oct. 24, 1950          J. R. THOMAS          2,526,914
GEAR TYPE VARIABLE SPEED HYDRAULIC CLUTCH
Filed Dec. 23, 1946          6 Sheets-Sheet 5
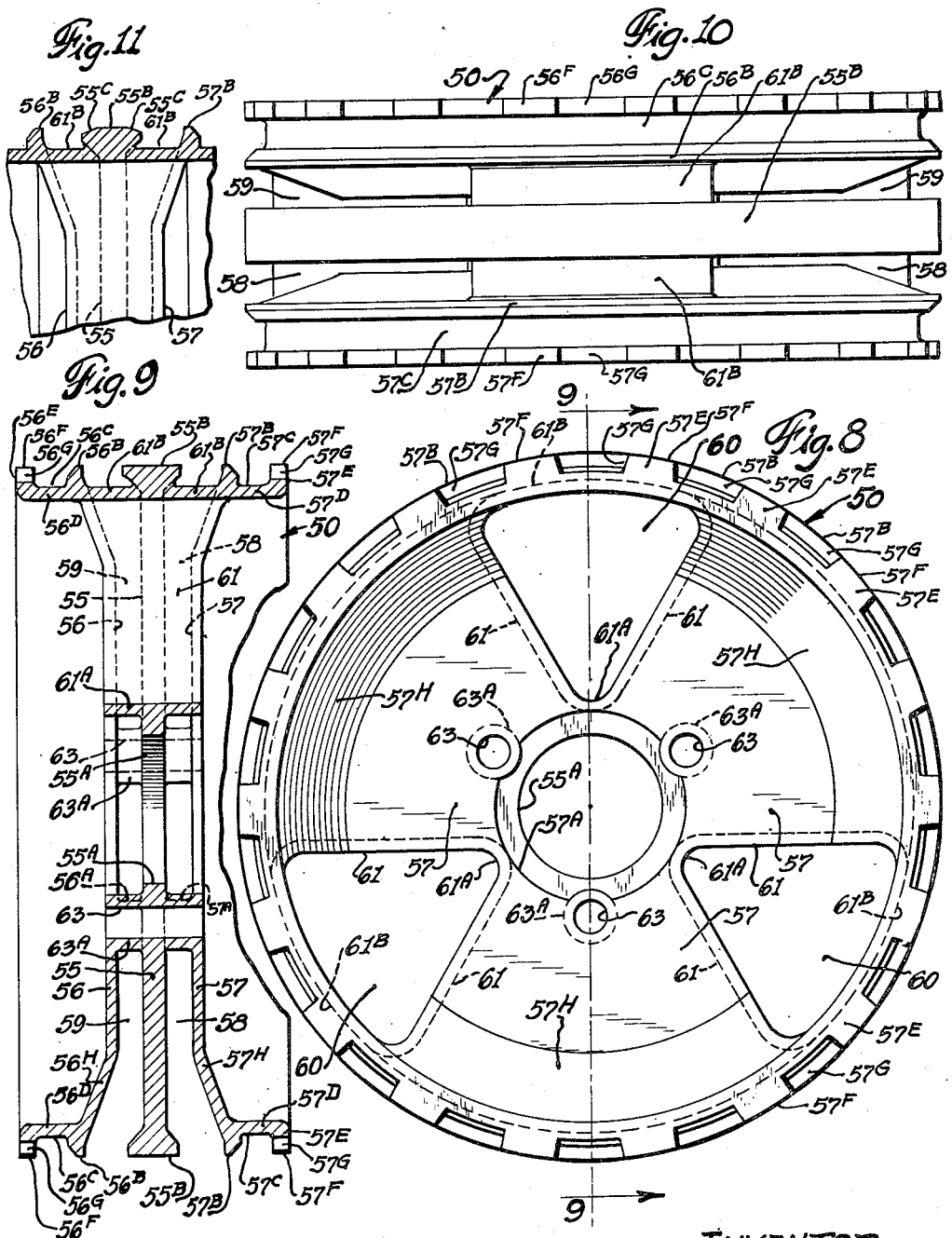
INVENTOR
John R. Thomas
By Frank Schraeder Jr.
Attorney

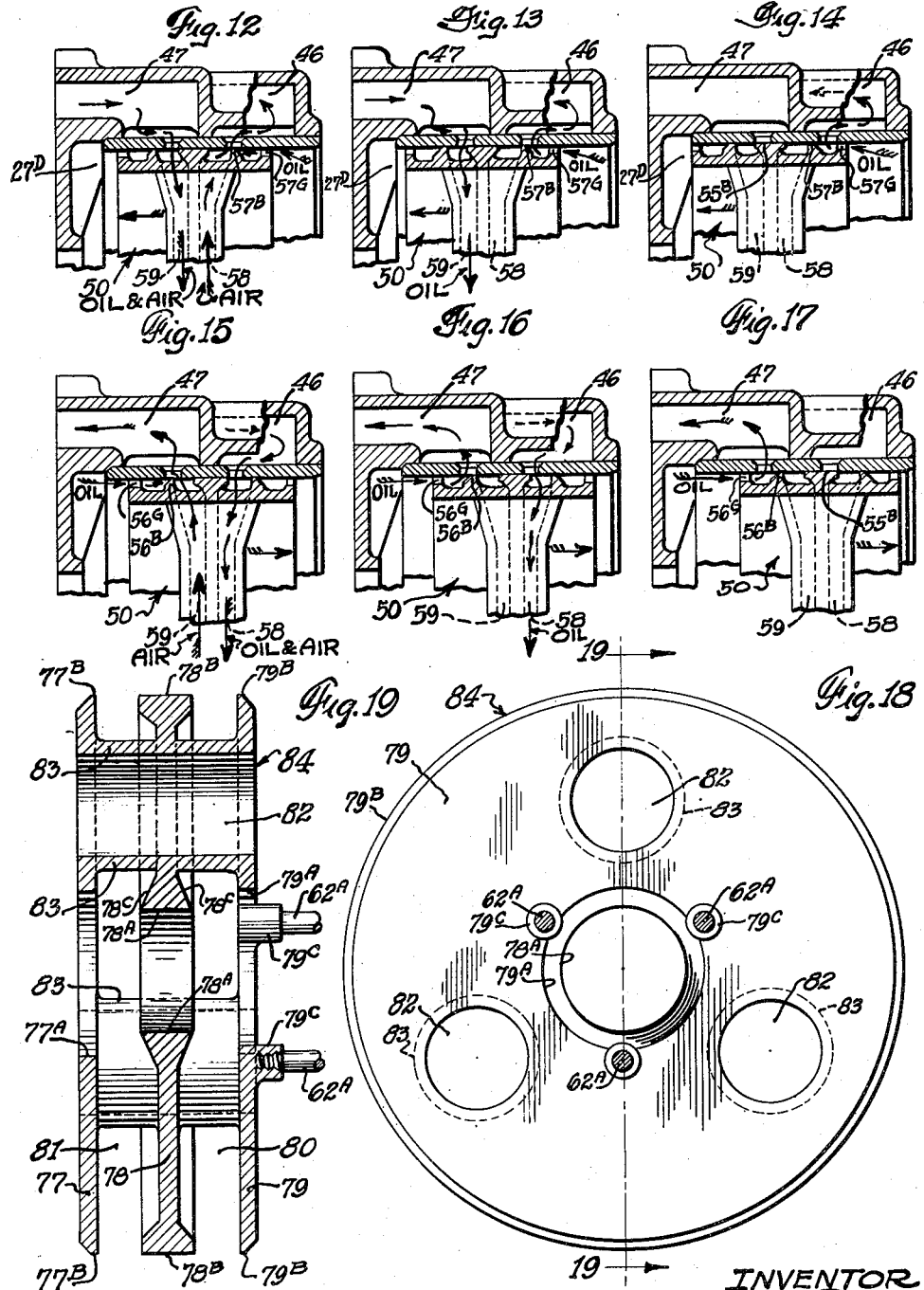

Patented Oct. 24, 1950

2,526,914

UNITED STATES PATENT OFFICE 2,526,914

GEAR TYPE VARIABLE-SPEED HYDRAULIC CLUTCH

John R. Thomas, Wichita, Kans., assignor to Thomas Hydraulic Speed Controls, Inc., Wichita, Kans., a corporation of Kansas Application December 23, 1946, Serial No. 717,915

28 Claims. (Cl. 192—61)

This invention generally relates to improvements in variable speed hydraulic clutches of the type shown in Reissue Patent No. 22,577 wherein two fluids are employed in variable mixtures as well as independently, and wherein the control of the independent fluids or the relative proportions thereof in variable operative mixtures is effected through movable valve means adapted for metering or arresting the flow of the fluids passing through a fluid circulating and power transmitting instrumentality such as, for example, a gear type pump commonly employed in clutches of this type.

The present invention has among its objects to provide certain improvements and novel operative features not disclosed in any prior art which materially enhance the utility of hydraulic clutches of the aforementioned type, increase the efficiency thereof, and the scope of adaptation of same to diverse control operations in a wide field of uses.

It is among the objects of my invention to provide a novel variable speed reversibly rotatable hydraulic clutch which is adapted to be driven by a reversibly rotatable constant or variable speed prime mover and which clutch includes a single valve movable axially from its central neutral position in either one of its two adjacent operative zones within the clutch casing through extraneously disposed control means operatively connected with the valve and wherein such clutch a change of operative movement of the valve from within one zone to within the other zone controls the reversed flow of the operating fluid through the fluid power-transmitting pumping means to thereby impart reverse rotation to the power output shaft of the clutch upon reverse rotation of the drive shaft of the prime mover; the valve being movable in either of its operative zones to arrest the flow of the operating fluid, or to progressively meter the flow thereof to thereby vary the transmission of power to the output shaft.

Another object of my invention is to provide a hydraulic clutch with a valve having an annular oil inlet channel formed within the peripheral rim thereof and provided with oil inlet openings which are preferably elongated circumferentially spaced arcuate slots within the peripheral face of the outer wall of the oil channel and such spaced oil inlet slots having open sides disposed directly adjacent to the inner face of a removable cylindrical valve seat which supports the valve and which valve oil inlet slots are in constant open communication with the oil annulus to permit flow of the oil directly from the oil annulus into the annular oil inlet channel within the flow control rim, the oil channel being adapted to communicate with preferably a plurality of circumferentially spaced valve seat intake openings through which the oil is metered by and during the movement of the flow control rim relatively to the valve seat intake openings; the metered flow of oil passing through the valve seat openings and through a pressure-stabilizing port into manifold ports and thence into the ports of the pumping means; the arrangement being such that the oil flows, under the control of the flow control rim, axially of the valve directly through oil inlet slots of the flow control rim along the inner face of the valve seat into the oil inlet channel for metered discharge therefrom through the valve seat openings into the pumping means. Thus the flow of the oil through the flow control rim oil inlet openings directionally axially of the valve and along the inner face of the valve seat results in an increase of the diametrical depth of the available active portion of the oil annulus and consequently an increase in the pressure of the oil thereat and facilitates the control of the metered flow of the oil into the pumping means responsively to the movements of the valve; the provision of an adequately elongated flow control rim relatively to the outer diameter of the valve by the provision of the oil inlet channel therein functioning to improve the stability of the valve during its movements within the valve seat.

In the adaptation of my improvements to a reversibly rotatable clutch, or to a uni-directionally rotatable clutch, an object of my invention is found in the provision of a cylindrical valve having a flow control rim provided with at least one pair of fluid intake and exhaust passages disposed diametrically of the cylindrical valve and extending in radial directions of the valve through the oil annulus; these fluid intake and exhaust passages extending from their permanently open ends within the central air zone outwardly into open communication with a pair of corresponding circumferentially disposed elongated arcuate intake and exhaust openings extending within the peripheral portion of the flow control rim and which arcuate openings are disposed between annular walls of the rim and adjacently to the inner face of the valve seat and adapted for communication with the valve seat intake and discharge openings.

Another object of my invention is to provide, in a reversible rotatable hydraulic clutch, a cylindrical valve having radially disposed passages preferably symmetrically arranged about a common partition wall disposed diametrically and preferably centrally axial of the valve; the passage or passages on each side of the partition wall extending from their permanently open ends within the central zone of air into open communication with an annular channel-like opening or openings in the rim of the valve; the passages on the opposite sides of the partition wall functioning alternately as intake and exhaust passages in response to reverse rotations of the clutch casing and corresponding operative movements of the valve alternately within adjacently disposed operative zones controlling reversals of flow of the operating fluid through the fluid pumping means and consequently reverse rotations of the clutch power output shaft.

Another object of my invention is found in the provision of a reversibly rotatable hydraulic clutch wherein two fluids of different resistance value are controlled by a single valve in their flow, either independently or in relatively proportionately varied mixtures, through a gear type power-transmitting pump mounted within the clutch casing; the single control valve being cylindrical and movably mounted in a removable cylindrical valve seat for reciprocatory movements in either one of two adjacently disposed operative zones of movement; the valve being provided with a novel flow control rim for metering, or arresting, the flow of the operating fluid through circumferentially disposed openings in the valve seat to thereby vary the speed, or to control the stationary position, of the power output shaft in response to movements of the valve in either one of its two adjacently disposed operative zones of movement and the flow control rim being operative to control the reverse flow of the operating fluid through the valve seat openings into and through the pump in response to a reversal of rotation of the clutch casing and a change of the movement of the valve from within one operative zone to within the other operative zone.

Another object of my invention is to provide, in a reversibly rotatable hydraulic clutch, a unitary cylindrical valve having a novel fluid flow control peripheral rim provided with a pair of axially spaced annular oil inlet channels disposed near the opposite ends of the valve and with their open sides at the inner face of the cylindrical valve-supporting seat; the outer peripherally disposed wall of each of the oil inlet channels being provided with at least one and preferably with a plurality of circumferentially spaced arcuate oil inlet openings extending transversely through the outer peripherally disposed wall.

Still another object of my invention is to provide a novel cylindrical valve having fluid intake and exhaust passages extending diametrically radially of the valve from their permanently open inner ends within the zone of air into circumferentially disposed channel-like openings in the flow control rim of the valve; the discharge of the fluids and particularly the discharge of air, during neutral operation of the clutch with the power output shaft in substantially stationary position for all practical purposes, being facilitated by the discharge of the fluids directly into the low pressure zone of the casing, that is, within the central zone of air, thus any disadvantageous back pressure on the discharge side of the circuit is eliminated by the passage of the exhaust fluids through an enclosed exhaust passage which extends through the oil annulus and discharges directly into the low pressure zone of air, thereby substantially reducing the drag or resistance torque upon the power output shaft particularly when the clutch is in neutral operation.

Still another object of my invention is found in the provision of a removably mounted cylindrical valve seat which is provided with a pair of axially spaced sets of circumferentially spaced intake and discharge openings; each set preferably consisting of groups of openings of at least two and preferably three different diameters whereby the flow of the operating fluid through the valve seat openings is more progressively metered by the movement of the flow control rim relatively to such valve seat openings of different diameters; and the removability of the valve seat permitting interchange of valve seats having openings of diameters differing from those of other valve seats and disposed in relatively different arrangement axially of the valve whereby the control characteristics, such as phase variation of the flow of the fluids in the intake circuit relatively to their flow in the discharge circuit, may selectively be varied.

A still further object of my invention is found in circumferentially beveling the opposite side portions of the peripheral face of the diametrically disposed partition wall of the valve to thereby provide a slight amount of pressure responsiveness as a resistance to the movement of the valve whereby a desirable operative resistance to the clutch-operating lever of, for example, a hoist or industrial power unit equipped with my improved clutch, will be afforded and which slight resistance to the movement of the valve facilitates the control operation of such apparatus particularly in "inching" operations of a hoist.

Still another object of my invention is to improve the efficiency of a hydraulic clutch, which is provided with a gear type pump, by recessing the opposed side faces of the sun and planet gears of the pump to thereby materially reduce the drag torque upon the power output shaft without sacrificing the power output efficiency of the clutch.

The various features of novelty whereby the present invention is characterized will hereinafter be pointed out with particularity in the appended claims; but, for a full understanding of the invention and of its various objects and advantages, reference may be had to the following detailed description taken in connection with the accompanying drawings exemplifying a preferred embodiment of my invention which is now considered to be the best mode for applying the novel principles of the invention.

In the drawings:

Fig. 1 illustrates a longitudinal section through a hydraulic clutch embodying my invention; the casing and power-transmitting fluid pump being shown in a longitudinal section taken on line A—A of Fig. 2, and the valve being shown in a longitudinal section taken on line B—B of Fig. 4;

Figs. 2, 3, 4, 5, 6 and 7 are cross-sections through the clutch taken respectively on lines 2—2, 3—3, 4—4, 5—5, 6—6 and 7—7 of Fig. 1;

Fig. 8 is an end elevation of my improved control valve;

Fig. 9 is a cross-section of the valve taken on line 9—9 of Fig. 8;

Fig. 10 is a plan view of the valve shown in end elevation in Fig. 8;

Fig. 11 is a cross-section through a rim portion of the valve corresponding to the cross-section of the upper portion of the valve shown in Fig. 9 but illustrating a modification of the valve structure;

Figs. 12, 13 and 14 illustrate progressive movements of the valve and show the valve in three different advanced positions of its inward control movement when the clutch casing is rotating in a clockwise direction as indicated by the arrow in Fig. 2;

Figs. 15, 16 and 17 also illustrate progressive movements of the valve and show the valve in three different advanced positions of its outward control movement when the clutch casing, as viewed in Fig. 2, is rotating in an anticlockwise direction;

Fig. 18 is an end elevation of modified valve structure providing therein two separate radially disposed fluid intake and exhaust passages; and Fig. 19 is a diametrical section taken on line 19—19 of Fig. 18.

In the preferred exemplification of my invention as illustrated in the drawings, the cup-shaped cylindrical casing, generally designated by numeral 20, includes the cylindrical wall 21 formed integrally at the power-input end with a transverse end wall 22. In heavy duty clutches it may be desirable to provide the cylindrical wall 21 and the end wall 22 with circularly spaced heat-dissipating fins which are shown by broken lines in Fig. 1 and designated by numeral 23. The power-output end of the casing is adapted to receive for connection thereto, as by circularly spaced screws 24, an end plate 25 which constitutes an end closure wall for the casing and also for the outer end of the body 26 of a fluid-circulating power-transmitting instrumentality in the form of a gear-type pump. The inner end of the pump body 26 is provided with a closure in the form of a cast manifold plate generally designated by numeral 27. The outer end plate 25 and the inner manifold plate 27 being removably securely fastened to the pump body 26 as by the bolts 28.

The outer end plate 25 is provided with a hub 29 to receive therein a removable ball bearing 30 for support of the driven member or power output shaft 31; the bearing 30 being removably secured within the hub 29 as by snap rings 32 and a suitable seal or seals 33 are provided within the outer end of the hub 29 adjacent the bearing 30.

The inner end of the power driven shaft 31 is preferably tapered and terminates in a shouldered end 31A which is rotatably supported in an inner race of a suitable antifriction bearing such as, for example, the needle type bearing 34 which is carried within the inwardly extending hub portion 35A of an adapter flange 35B preferably formed integrally with the drive or input shaft 35.

The provision of an adapter flange 35B as a part of the drive shaft 35, whether integral therewith or separate therefrom, permits the adaptation of a standard clutch to drive shafts differing in diameters as in instances where the clutches are mounted directly on the shafts of prime movers such as electric motors having armature shafts differing in diameters.

As illustrated, the adapter flange 35B is seated within an annular recess 22B of the hub portion 22A and is coveniently securely fastened to the clutch casing wall 22, as by screws 36.

The gear pump body 26, as more clearly shown in Figure 2, consists of a unitary casting preferably of noncircular formation to reduce its weight and is defined by a peripheral face which may be described as of triangular configuration with three circular-like lobular portions 26B formed integrally with and extending outwardly from the medial portions of the three triangularly disposed side faces 26A of the body; the portions within the apices of the triangularly shaped portion of the pump body being adapted to house fluid intake and discharge ports and the three lobular portions 26B constituting housings for three planet gears 37. To further reduce the weight of the pump body 26, three openings 26F are provided therein which extend transversely through the body 26.

The three lobular body portions 26B are provided with arcuate cavities 26C which extend transversely through the body 26, face the centrally axially disposed sun gear 38, and open into a central cavity in which the sun gear 38 is mounted; the cavity for the sun gear likewise extending transversely through the body 26 and being defined by three arcuate transverse wall faces 26D which extend from and between corresponding ends of the arcuate offset wall faces 26E; the opposite ends of the offset wall faces 26E connecting with the open ends of the planet gear cavities 26C and the offset wall faces 26E providing enlarged passages at the intake and discharge ends of each planet gear cavity 26C which communicate with the inner ends of the fluid intake and discharge ports in the pump body.

Each planet gear 37 is rotatably mounted on a tubular pin 39 carrying an antifriction bearing, such as the needle bearing 40; the shouldered ends of the tubular pins 39 are supported in recesses within the opposed faces of the end and manifold plates respectively designated by numerals 25 and 27 and each pin 39 is secured by a bolt 41 which extends through the casing end wall 25 and through the longitudinal opening within the tubular pin into threaded engagement with the transverse wall portion 27A of the manifold plate 27.

The sun gear 38 is suitably secured to the driven shaft 31 as by the key 42.

From the above description it will readily be apparent that the planet gears 37 are rotatably mounted on the pins 39 which are supported on the pump body 26 and clutch casing 20 and that they bodily revolve with the clutch casing 20 about the sun gear 38 while simultaneously rotating about their axial pins 39 through the operative meshing of their teeth with the teeth of the sun gear 38.

For illustrative operative purposes, it will be assumed in the following descriptive matter that the rotation of the clutch, as viewed in the several cross-sections shown in Figures 2 to 7 inclusive, is clockwise as indicated by the arrows shown in said figures and, therefore, in such assumed rotation, the pump body 26 is provided with intake ports 43 and discharge ports 44 which are flared transversely of the pump body toward their open ends at their points of communication with the enlarged fluid chambers defined by the wall faces 26E as indicated in Figure 1 by numeral 44A. The pump body intake and discharge ports are so arranged that the intake port and the discharge port of an operatively associated planet gear are disposed in longitudinal alignment within a triangular side of the pump body whereby the intake port for one of the planet gears and the adjacent discharge port for another of the planet gears converge toward each other in a direction generally outwardly from substantially the intersections of the pitch lines of these two planet gears with the sun gear and each such outwardly converging adjacent pair of intake and discharge ports having similarly curved portions as, for example, the curved portion of the discharge port 44 designated in Figure 1 by numeral 44B, to thereby present their respective inlet and discharge openings very closely adjacently to each other within the plane of the inner face of the pump body 26 which extends transversely to the axis of the clutch and such pump body inlet and discharge port openings are designated in Figure 2 by numerals respectively 43C and 44C.

The manifold plate 27 consists of a transverse wall portion 27A and an axially extended integral cylindrical wall portion 27B disposed concentrically with the longitudinal axes of the drive shaft 35 and the driven shaft 31 and constitutes a support for the cylindrical valve seat 45.

To decrease the weight of the clutch, the transverse manifold wall 27A is preferably provided with a circular opening 27C concentric with the driven shaft 31. The transverse wall 27A is also provided with a plurality of reenforcing ribs 27D formed integrally therewith and which ribs 27D constitute stop abutments for limiting the innermost position of the fluid control valve which is generally designated by numeral 50.

The manifold plate transverse wall portion 27A is also provided with circularly equidistantly spaced integral wall extensions 27E which constitute closure walls for the three planet gears 37 and their cavities 26C and in which wall portions one end of each pin 39 and its bolt 41 of each planet gear 37 is supported.

The manifold plate 27 is also provided with circularly equidistantly spaced integral housings 27F each provided with a pair of adjacent axially disposed intake and discharge ports designated by numerals respectively 46 and 47 which register with the pump body intake and discharge ports at their adjacent ends in the plane of the transverse wall 27A and which ports 46 and 47 are provided with circularly spaced but relatively axially offset openings in open communication with a pair of axially spaced annular pressure-stabilizing grooves 48 and 49 which are annularly disposed channels formed in the inner face of the cylindrical wall portion 27B of the manifold plate 27.

The cylindrical valve seat 45 is removably mounted within the inner face of the cylindrical wall portion 27D and has one end in abutment with the valve stop ribs 27D and its opposite end in plane alignment with the circular end face of the cylindrical wall 27B. The valve seat 45 is conveniently removably secured in fixed position within its cylindrical supporting wall 27B as by circularly spaced removable clips 51 which project inwardly radially beyond the inner face of the valve seat 45 and which are removably secured to the end face of the cylindrical wall 27B as by screws 52; the clips 51 also functioning as limit stops for the outermost position of the valve 50.

The interchangeable hollow cylindrical valve seat 45 is provided with a plurality of circumferentially spaced series of fluid intake openings which are axially spaced from a plurality of circumferentially spaced series of fluid discharge openings; each of the circularly arranged series consisting of preferably sets of openings of at least two or preferably three different diameters as more clearly shown in Figures 4 and 5 and wherein the valve seat intake openings of progressively decreasing diameters are designated by respectively numerals 53A, 53B and 53C and the discharge openings of progressively decreasing diameters by respectively numerals 54A, 54B and 54C, however, the openings could be of uniform diameters although the removable mounting of the valve seat 45 permits its interchange with other valve seats having openings of other diameters arranged differently whereby the control characteristics, such as phase variation of the fluid flow in the intake circuit relatively to the fluid flow of the discharge circuit may selectively be varied as will in the description to follow become more apparent.

The movable control valve means may be described as comprising a dual valve of cylindrical form preferably consisting of a unitary cylindrical structure generally designated by numeral 50 and, as shown in Figures 8, 9 and 10, composed of three diametrically disposed axially spaced circular walls, namely, a central wall 55 and spaced, axially therefrom, the two outer or end walls 56 and 57.

The central wall 55 extends radially outwardly from a central opening therein defined by the circular edge 55A and terminates in a slightly axially widened peripherally disposed circular central face 55B of the novel fluid flow control rim of the valve structure.

The outer or end walls 56 and 57 extend radially outwardly from the central openings therein defined by the circular edges, respectively, 56A and 57A and terminate in the preferably narrow circular outer faces, respectively 56B and 57B of the novel fluid flow control rim of the valve structure.

As shown in Figures 1, 8, 9 and 10, the outer end portions of the rim of the dual valve structure are axially extended to provide oil inlet channels 56C and 57C disposed inwardly of the peripheral face of the fluid flow control rim; the oil inlet channel 56C being defined by the annular wall portion 56D of U-shaped cross-section of which the outer radially disposed circular wall portion 56E is provided with a peripheral face 56F in axial alignment with the peripheral faces 56B and the peripheral face 55B of the central wall 55 and the oil inlet channel 57C being defined by the anular wall portion 57D of U-shaped cross-section of which the outer radially disposed circular wall portion 57E is provided with a peripheral face 57F also in axial alignment with the peripheral faces 56B and 57B and the peripheral face 55B of the central wall 55.

The oil inlet channels 56C and 57C are provided with circularly spaced arcuate oil inlet openings, respectively, 56G and 57G extending axially transversely through walls, respectively, 56E and 57E. It will be noted that these valve oil inlet openings 56G and 57G are open directly adjacently to the inner face of the valve seat 45.

As shown in Figures 1, 8, 9 and 10, the diametrically disposed walls 55, 56 and 57 are axially spaced to provide between them fluid passages which are adapted to alternately function as intake and exhaust passages depending upon the direction of rotation of the clutch casing.

With the clockwise rotation of the clutch casing as viewed in the cross-sections shown in Figures 2 to 7 inclusive, the spaces 58 between the opposed faces of the diametrically disposed central wall 55 and the diametrically disposed outer or end wall 57 function operatively as air intake passages and the spaces 59 between the opposed faces of the central wall 55 and the outer or end wall 56 function as exhaust passages for the air, oil and mixtures thereof.

As shown in the valve structure in Figures 1, 8, 9 and 10, the valve 50 is provided with preferably three open passages 60 extending axially of the valve and transversely through the three diametrically disposed walls 55, 56 and 57 and circularly equally space the diametrically disposed air intake and fluid exhaust passages located between the latter walls. The three passages 60 are preferably conveniently shown as of substantially triangular shape and are defined by triangularly disposed enclosure walls 61 which are formed integrally with and extend between the walls 55, 56 and 57 to seal the passages 60 from communication with the diametrically disposed intake and exhaust passages.

The triangularly disposed walls 61 extend outwardly from their inwardly disposed rounded apieces 61A, the outer faces of which extend to the peripheral edges 56A and 57A of the central openings in the valve, to the rim of the valve whereat the arcuate wall portions 61B thereof are radially aligned with the annular bottom walls of the oil inlet channels 56C and 57C. Thus there are provided, in the particular valve construction shown in Figures 1 to 10 inclusive, three radially outwardly flaring diametrically disposed air intake passages 58 and three radially outwardly flaring diametrically disposed fluid exhaust passages 59, on the opposite sides of the central wall 55.

In order to provide the widened peripheral face 55B for the central wall 55 and to increase the width of the peripheral openings between the diametrically disposed passages 58 and 59 adjacently to the valve seat 45, the outer arcuate portions of the diametrically disposed walls 56 and 57 are angularly relatively oppositely flared as at 56H and 57H.

The valve as shown in the drawings is designed to be shifted axially into its various operative positions by three shift rods 62 which are secured at their inner ends within the cylindrically walled openings 63 of the valve 50 in any suitable manner as by the washers 64 and snap rings 65.

The cylindrical walls 63A extend within the diametrically disposed passages 58 and 59, are formed integrally with the diametrically disposed walls 55, 56 and 57, and seal the shift rod openings 63 therein from communication with the passages 58 and 59.

The outer ends of the valve shift rods 62 extend through suitably sealed bushings 66, carried in the hub 22A of the casing end wall 22, into rigid connection with the valve shifter sleeve 67 which is mounted on the drive shaft 35 for rotation therewith but axially shiftable relatively to the drive shaft 35 as by the non-rotatable shifter collar 68 carrying a suitable ball bearing 69 within which the drive shaft 35 and shifter sleeve 67 are rotatably mounted. The valve shifter collar 68 has oppositely disposed studs 68A which are adapted for continuous engagement by the forked end of a pivoted valve-shifting lever not shown but well known in the art.

For illustrative operative purposes, the drive shaft 35 is shown extended outwardly for support within a ball bearing 69¹ carried in a suitable housing 70 which is provided with an integral bracket 70A adapted to be secured, as by bolts 71 to any suitable rigid support or structural element such as the angle iron 72.

The outer end of the drive shaft 35 is also shown, for illustrative purposes, as carrying a pulley 73 which is adapted to be belt-driven by a prime mover and which pulley 73 is shown as having an interchangeable adapter hub 74 secured thereto by screws 75 and to the drive shaft 35 as by the keys 76.

In the modified valve structure shown in Figure 11, the opposite side portions 55C of the circular face 55B of the central diametrically disposed wall 55 are slightly beveled to provide slight pressure responsiveness or resistance to the shifting movements of the valve where such slight resistance to the shifting of the valve operating lever is to an advantage as, for example, in so-called "inching" operations of hoisting apparatus. To accommodate the use of this form of valve, the axial spacing of the intake and discharge openings of the valve seat is such that in the final movement of the valve to high speed position, similar to the positions shown in Figures 14 and 17, wherein the valve seat oil intake openings are fully open, the valve seat discharge openings will be fully closed by central portion of the face 55B which is between the beveled side portions 55C; the beveled side portions 55C of the flow arresting face portion 55B functioning to provide the desired pressure-responsiveness and to more progressively close the valve seat discharge openings.

In a simpler form of valve structure embodying the principles of my invention, the dual valve illustrated in Figures 18 and 19, generally designated by numeral 84, may be described as consisting of three axially spaced annular walls 77, 78 and 79 providing between them a pair of fluid passages which are adapted to alternately function as intake and exhaust passages depending upon the direction of rotation of the clutch casing. Under the present assumption that the casing rotates clockwise as viewed in the cross-sections shown in Figures 2 to 7 inclusive, the air inlet passage is designated by numeral 80 and the fluid exhaust passage by numeral 81.

The central diametrically disposed wall 78 and the two outer or end walls 77 and 79 are provided with central openings for passage therethrough of the clutch driven shaft 31 about which shaft these openings are concentrically disposed and permanently open within the air zone of the clutch casing during its rotation; such openings being designated by respectively numerals 78A and 77A and 79A and functioning to permit free movement of air into the air intake passage 80 and free movement of air, mixtures of oil and air, or oil, out of the exhaust passage 81.

In the form of valve structure illustrated in Figures 18 and 19, the fluid flow control rim is similar in construction to that portion of the valve structure shown in Figures 1, 8, 9 and 10, that is, the central wall 78 is enlarged at the rim to provide a comparatively wide circular peripheral face 78B and the two outer wall portions of the rim are oppositely beveled to provide thereat comparatively narrow circular peripheral faces 77B and 79B axially circularly aligned with the face 78B. Also, in the form of valve structure shown in Figures 18 and 19 the valve shift rods 62A are shown at their inner ends as simply screw threaded into bosses 79C formed on the outer face of the wall 79.

To afford free axial movement of the fluids into the opposite ends of the fluid chamber within the clutch casing at the opposite ends of the valve 50, the valve shown in Figures 1, 8, 9 and 10 is provided with a plurality of transverse permanently open passages 60 of triangular cross-section, and the valve shown in Figures 18 and 19 is also provided with a plurality of transverse permanently open passages 82 which are cylindrical and defined by the circular walls 83 which are preferably formed integrally with the walls 77, 78 and 79 and seal the passages 82 from communication with the radially disposed passages 80 and 81. To further insure the free movement of oil between the portion of the fluid chamber at the inner end of the valve 50 and that portion of the oil chamber disposed between the outer side of cylindrical wall portion 27$^B$ of the manifold plate 27 and the inside face of the clutch wall 21, the cylindrical manifold wall 27$^A$ is provided with a plurality of circularly spaced openings 27$^G$.

From the above descriptive matter and the accompanying drawings, it will be apparent that the valve 50 illustrated in Figures 1, 8, 9 and 10 is provided with a plurality of separate radially disposed air intake passages and a plurality of separate radially disposed fluid exhaust passages; the air intake passages being separated by the central wall 55 from the exhaust passages.

The valve illustrated in Figures 18 and 19 is provided with only one radially disposed air intake passage and only one radially disposed fluid exhaust passage.

It will be noted that in both forms of valves, during the rotation of the clutch casing, the radially disposed intake and exhaust passages extend from the central zone of air and through and into the zone of the oil annulus, and that the inlet and outlet openings of these intake and exhaust passages are permanently open within the central zone of air, and all of these radially disposed intake and exhaust passages are movable with the valve in both air and oil zones.

As above indicated a very desirable advantage is afforded in the arrangement of both of the radially disposed valve intake and exhaust passages for extension through the oil zone into the air zone since in the reversible rotatability of my clutch these passages must function alternately as intakes and exhausts depending upon the direction of rotation of the clutch casing and, therefore, the valve passage or passages functioning to exhaust the air and oil therethrough directly into the air zone relieve the fluid discharge circuit, particularly the air discharge circuit, of back pressure which would be present in the discharge of the air into the oil annulus, thus the elimination of back pressure on the air discharge circuit reduces the neutral drag upon the driven shaft during neutral clutch operation.

In my improved hydraulic clutch disclosed herein wherein the control of the independent fluids, such as air or oil, or of relatively variable proportions thereof in desired operative mixtures, is selectively effected through the novel dual valve, the operation of the clutch and the functions of the valve will become readily understood from the following description of the operation which for this purpose is still based on the assumption that the clutch casing 20 and the input or driving shaft 35 are, due to their above described rigid operative interconnection, rotating as a unit clockwise when viewed in Figures 2 to 7 inclusive.

The casing fluid chamber 85 is provided with an oil inlet opening 86, normally closed by a screw plug 87, through which the chamber 85 is partially filled with oil which, during the rotation of the clutch casing assumes an annular form surrounding a central core of air which, for illustration, is defined by the dot and dash line designated by "X" in Figure 1. It will be noted that the permanently open ends of the radially disposed intake and exhaust passages within the central portion of the control valve are constantly disposed within the air zone of the casing during its rotation.

Since all fluids including air, or mixtures of air and oil, or oil must pass through the series of valve seat intake openings 53$^A$, 53$^B$ and 53$^C$, and during variable speed operation, not including maximum high speed operation, must be discharged through the series of valve seat openings 54$^A$, 54$^B$ and 54$^C$, the flow circuit may best be described as follows without giving consideration to the control of the flow of the fluids by the valve.

All such fluids pass through the valve seat intake openings 53$^A$, 53$^B$ and 53$^C$ directly into the annular pressure-stabilizing groove 48, thence into the three manifold intake ports 46, and thence through the pump body intake ports 43 into the intake chambers at the arcuate walls 26$^E$ disposed between the planet gears 37 and the sun gear 38, thence around the planet gears 37 within the gear cavities 26$^C$ and the sun gear 38 and therefrom into the discharge chambers at the arcuate walls 26$^E$ at the opposite sides of the planet gears 37.

From the discharge chambers the fluids pass through the pump body discharge ports 44, thence into the manifold discharge ports 47, thence into the pressure-stabilizing groove 49 and therefrom through the valve seat discharge openings 54$^A$, 54$^B$ and 54$^C$ or, in other words, the power-transmitting elements which are operatively connected to and between the power-actuated rotatable driving instrumentality and the rotatable driven instrumentality are provided with ports for the resistant fluid or mixtures of fluids and these ports provide a fluid circuit having at least one intake opening and at least one discharge opening and these circuit openings are disposed within the zone of oil and the flow of the air, or mixtures of relatively varied proportions of air and oil, or of only oil, or of neither, into and out of said circuit is at all times controlled by a single cylindrical valve movably mounted within the fluid chamber of a rotatable casing operatively connected preferably with the power-actuated driving instrumentality.

The transmission of power and selectively variable speed to the driven instrumentality or driven shaft 31 from a power-actuated driving instrumentality or a prime mover and the clutch input shaft 35 which is driven by the prime mover in any suitable manner, are controlled by an axially movable valve 50 which controls and regulates the flow of the fluids through or into the fluid circuit connected with the fluid pumping means. More specifically stated, the valve 50 controls the flow of air, or mixtures of variable proportions of air and oil, or of solely oil, or of neither, through or into the port circuit of the pumping means by the novel flow-control rim of the valve and its cooperating radially disposed intake and exhaust passages.

As shown in Fig. 1, the valve 50 is in neutral position and with the clutch casing still rotating in clockwise direction as heretofore assumed, only air from the central air zone is being admitted into the radial intake passages 58 (or passage 80 of valve 84) and, through the suction created within the gear type pump, the air is moved through the series of valve seat intake openings 53A, 53B and 53C for circulation through the above-described fluid circuit and discharged through the valve seat discharge openings 54A, 54B and 54C into the valve exhaust passages 59 (or passage 81 in valve 84) and therefrom into the central air zone.

While the flow control rim of the valve is constantly within the oil annulas and while the oil is free to pass through the circularly spaced rim openings 57G into the oil channel 57C the oil, in such neutral operation, is sealed from passing into the valve seat intake openings by the circular sealing face 57B of valve outer wall 57. In the valve structure shown in Figures 18 and 19, the two outer oil channels 56C and 57C have been eliminated without disadvantage except that in the clutches of comparatively large diameters where the diameter of the valve is correspondingly increased, the additionally increased face width or length of the valve is an advantage in stabilization of its reciprocatory movements in its valve seat. Under such neutral operation the output or driven shaft 31 for all practical purposes is in inoperative or stationary position.

The fluid metering and speed controlling operation of the valve by means of its novel flow control rim will be readily understood by reference to Figures 12, 13 and 14 which show the valve in three progressively inwardly shifted positions from the neutral position shown in Figure 1 during said clockwise rotation of the clutch casing.

In the position of the valve 50 shown in Figure 12, the narrow circular fluid intake control face 57B of the valve 50 is clearly shown moved to such position relatively to the valve seat intake openings that both air and oil are being admitted into the fluid circuit through the valve seat intake openings for circulation through the pump and for discharge therefrom through the fully open valve seat discharge openings into the radial exhaust passages 59 (or passage 81 of valve 84) and therefrom into the central air zone. Obviously, the mixture of air and oil will interpose a resistance between the teeth of the planet gears and the sun gear to thereby impart some power to the driven shaft.

In the position of the valve 50 shown in Figure 13, the narrow circular fluid intake control face 57B has been shifted to block the entrance of air into the valve seat intake openings, permitting only oil to enter into the pump through the partially open valve seat intake openings while the oil passing from the pump through the partially open valve seat discharge openings is being discharged into the central air zone through the radial exhaust passages 59 (or passage 81 of valve 84). The interposed resistance of solely oil into the gear compartment will therefore impart increased speed and power to the driven shaft 31.

In the full high position of the valve 50 shown in Figure 14, the valve has been shifted to its innermost position into abutment with the flat faces of the ribs 27D, the valve seat intake openings being fully open for full flow of oil into the pump, but no air being admitted, while the valve seat discharge openings are fully closed by the circular face 55B to thereby fully arrest the flow of the oil from the pump whereby the driving and driven shafts are rotating in substantially a one to one ratio with maximum power output and thus a positive drive fluid coupling is provided wherein the slip under full load is for all practical purposes negligible.

In installations where the drive shaft 35 and clutch casing must necessarily rotate anti-clockwise as viewed in Figures 2 to 7 inclusive, the flow of the fluid circuit through the pump and its manifold ports is obviously reversed from that in the hereinabove described operations and consequently the flow of the fluid or fluids through the valve and its valve seat openings is correspondingly reversed, that is, the radial passages 59 in the valve 50 (or passage 81 in valve 84) function as intake passages and valve seat openings 54A, 54B and 54C function as intake openings and in such reversely rotating clutch casing the flow of the fluids is controlled by the same valve 50 (or 84) by its movements in a direction to the right from its neutraul position as shown in Figure 1. Figures 15, 16 and 17 show the valve moved outwardly, or to the right as viewed in Figure 1, into three progressively outwardly advanced positions from the neutral position shown in Figure 1; the operative functions of the valve in the positions shown in Figures 15, 16 and 17 corresponding to the hereinabove described functions of the valve illustrated in respectively Figures 12, 13 and 14.

It should now be pointed out that the diameter of the central opening 55A in the central wall 55 of valve 50 is smaller than the diameters of the openings 56A and 57A in the outer side walls whereby the inwardly extended inner portion of the central wall functions to fend and deflect the flow of the discharged fluid away from the air intake openings at the opposite side of the central wall 55 to thereby prevent uncontrolled recirculation of the discharged fluid directly through the inlet openings of the diametrically disposed air intake passages. This feature is also provided in the simplified valve 84 illustrated in Figures 18 and 19 wherein the central opening 78A is smaller in diameter than the openings 77A and 79A in the outer side walls.

To enhance the deflection of the discharged fluid away from the air intake side of the central walls 55 and 78, the central portions thereof, at respectively the openings 55A and 78A, may be widened to provide oppositely directed angularly disposed circular deflecting faces, as for example, the fluid deflecting faces designated by numeral 78C in Figure 19.

I have found that the efficiency of a hydraulic clutch employing a gear type pump may be enhanced by the improvement of the gears. The effective seal between the suction and discharge ports is no greater than the width of the gear tooth at pitch line and, therefore, any additional sealing surfaces at the sides of the gears are not only ineffective to increase the efficiency of the pump but react to a disadvantage by increasing the magnitude of the resistance or drag resulting from fluid interposed in the confined space between the sides of the gears and the relatively stationary side walls of the pump casing and, therefore, an enlargement of such fluid confining spaces between the sides of the gears and the pump casing side walls results in a decrease of drag torque.

To improve the efficiency of the pump, I recess the opposite ends of the gears. The recesses are clearly shown in Figures 1 and 2; the circular recesses provided in the planet gears 37 are designated by numeral 37A and in the sun gear 38 by numeral 38A. I have found that circular recesses of a depth of preferably about $\frac{1}{16}$ to $\frac{1}{8}$ of an inch extending radially outwardly to within a predetermined distance from the root circle of the teeth will very substantially reduce the drag torque transmitted to the driven shaft 34; in certain tests conducted for this purpose, reductions in drag torque of from 50 percent to 75 percent were achieved.

I have also found that in the most efficient recessing achieved, the width of the peripheral annular face designated by 36B in Figure 2, which circumscribes the circular recess 36A in the sun gear 36, must be substantially equal to the thickness of the gear tooth at the pitch line of the sun gear and that in a planet gear, such as 37, the width of the peripheral annular face designated by 37B in Figure 2 must be substantially equal to one-half of the thickness of the gear tooth at the pitch line of the planet gear.

It will now be readily apparent from the preceding description of the flow of the fluids under the control of the valve rim as illustrated in Figures 12 to 17 inclusive, that, in all operative positions of the valve, the oil is admitted into the pump port circuit intake openings in the valve seat directly from the oil annulus and not through the valve, that is, the oil flowing into the intake side of the pump port circuit circumvents or bypasses the circular wall portion of the rim at the periphery of a diametrically disposed outer wall of the valve as the face 53B or 57B shown in Figures 9 and 12 to 17 inclusive (or face 77B or 79B shown in Figure 19) uncovers the valve seat intake openings to permit such direct flow of oil therein.

While I have stated that the clutch casing is partially filled with oil it is now well known that fluid other than oil may be successfully employed in clutches of the type under present consideration herein, hence, I wish to be understood that my use of the term "oil" in the claims is intended to be broadly generic or definitive of any suitable fluid which may be interposed as a resistant between the power-transmitting elements of the fluid pumping means.

It will also be understood by those skilled in the art to which my invention relates that the details of construction of the various parts and their arrangements, shown in the drawings for illustrative purposes, may be modified and rearranged within the scope of the appended claims without departing from the spirit of the invention.

I claim:

1. A variable speed hydraulic coupling comprising a power-actuated rotatable driving instrumentality; a rotatable driven instrumentality; a rotatable casing operatively connected with one of said instrumentalities having a chamber partially filled with oil whereby, during the rotation of said casing, there is provided in said chamber an outer annular zone of oil and an inner central zone of air; a cylindrical valve seat disposed within said zone of oil; power-transmitting means including ports providing a fluid circuit having an intake opening and a discharge opening both disposed within said valve seat and relatively movable coacting power-transmitting elements carried on and operatively connecting said instrumentalities; a single cylindrical valve having a peripheral rim mounted for movement on said valve seat for controlling fluid flow into and out of said circuit, said valve including a radially disposed air passage having an air inlet opening within the zone of air and an air discharge opening within said rim and a separate radially disposed exhaust fluid passage having an exhaust fluid inlet opening within said rim and an exhaust fluid discharge opening within the zone of air, said air passage discharge opening and said exhaust fluid passage inlet opening being axially spaced one from the other by an intermediate wall portion of the rim.

2. A variable speed hydraulic coupling as set forth in claim 1 wherein said valve rim is of such length axially of the valve to permit said valve to be moved to a position whereat said intermediate wall portion of the rim has been moved to completely arrest the flow of the oil from said circuit discharge opening while said circuit intake opening is open to the inflow of oil directly from the zone of oil, and wherein said inlet opening of said radially disposed air passage is permanently open, and wherein said discharge opening of said exhaust fluid passage is permanently open.

3. A hydraulic clutch adapted to be interposed as a variable speed power-transmitting coupling between rotatable power-driven means and a driven shaft and comprising a rotatable casing provided with driving means therefor and having a chamber therein partially filled with oil whereby, during the rotation of the casing, there is provided in said chamber an outer annular zone of oil and an inner central zone of air; a valve seat disposed within the zone of oil; fluid-circulating power-transmitting means within said casing including ports providing a fluid circuit having an intake opening and a discharge opening, said fluid circuit openings being spaced apart axially of the casing and extending through said valve seat, relatively movable coacting power-transmitting elements carried on, and operatively connecting, said casing and said driven shaft; a valve having a peripheral rim movable on said valve seat relatively to said circuit intake and discharge openings and provided with a radially disposed air passage having a permanently open air inlet opening within the zone of air and an air discharge opening within said rim and an independent radially disposed exhaust fluid passage having an exhaust fluid inlet opening within said rim and a permanently open exhaust fluid discharge opening within the zone of air, said air passage discharge opening and said exhaust fluid passage inlet opening being separated by an intermediate wall portion of the rim; and operating means, actuable exteriorly of the casing, extending into the casing for operative connection with the valve adapted during the rotation of the casing to progressively move the valve from neutral position to thereby impart a progressively increased speed to said driven shaft until the valve has been moved to a position whereat said air passage discharge opening has been shifted completely out of registration with said circuit intake opening to thereby arrest the flow thereinto of air and permit flow thereinto of only oil whereat said intermediate wall portion of the rim partially restricts the flow of the oil from said circuit discharge opening into said exhaust fluid passage, said valve being thereafter progressively movable to a position whereat said intermediate wall portion of the rim has been moved to completely arrest the flow of oil from said circuit discharge opening while said circuit intake opening is fully open to the inflow of oil directly from the zone of oil.

4. A variable speed hydraulic clutch adapted to be interposed between power-actuated rotatable driving means and a driven shaft and comprising a rotatable casing operatively connected with said driving means having a chamber partially filled with oil whereby, during the rotation of said casing, there is provided in said chamber an outer annular zone of oil and an inner central zone of air; fluid pumping means including a plurality of relatively movable coacting power-transmitting gear elements carried on and operatively connecting said casing and said driven shaft, a manifold plate including ports providing a plurality of fluid circuits communicating with said gear elements and each circuit having an intake opening and a discharge opening, said manifold plate having an annular pressure-stabilizing intake port communicating with all of said circuit intake openings and an annular pressure-stabilizing discharge port communicating with all of said circuit discharge openings; a cylindrical valve seat disposed within the zone of oil provided with a plurality of intake openings and a plurality of discharge openings, said valve seat intake and discharge openings being relatively axially spaced and communicating respectively with said pressure-stabilizing intake and discharge ports; an axially movable cylindrical valve having a peripheral rim movable on said valve seat and including a plurality of radially disposed air passages having permanently open air inlet openings within the zone of air and air discharge openings within said rim and a plurality of separate radially disposed exhaust fluid passages having exhaust fluid inlet openings within said rim and permanently open exhaust fluid discharge openings within the zone of air, said air passage discharge openings and said exhaust fluid passage inlet openings being axially spaced apart by an intermediate wall portion of the rim and being of such widths axially of the valve and so axially spaced relatively to said valve seat intake and discharge openings that a progressive movement of the valve in one direction from said neutral position will impart a progressively increased speed to said driven shaft until the valve has been moved to a position whereat said air passage discharge openings have been shifted completely out of communication with said valve seat intake openings to thereby arrest the flow therein of air and permit flow therein of only oil whereat said intermediate wall portion of the rim partially restricts the flow of the oil from said valve seat discharge openings into said exhaust fluid passages, said valve being thereafter further progressively movable in the same direction to a position whereat said intermediate wall portion of the rim completely arrests the flow of the oil from said valve seat discharge openings while said valve seat intake openings are fully open to the inflow of oil directly from the zone of oil.

5. A variable speed hydraulic clutch as set forth in claim 4 wherein said air discharge openings and said exhaust fluid inlet openings in said rim are disposed in parallel planes which extend transversely to the axis of the valve and are axially equally spaced from a parallel plane intersecting the center of the annular face of said intermediate wall portion of said rim whereby the clutch casing and the driven shaft are adapted for reverse rotation operation and whereupon such reverse rotation and progressive movement of the valve in the opposite direction from said neutral position the driven shaft is reversedly rotated with progressively increased speed.

6. A variable speed hydraulic clutch as set forth in claim 3 wherein said air discharge opening and said exhaust fluid inlet opening in said rim are disposed in parallel planes which extend transversely to the axis of the valve and are axially equally spaced from a parallel plane intersecting the center-line of the annular face of said intermediate wall portion of said rim whereby the clutch casing and the driven shaft are adapted for reverse rotation operation and whereupon such reverse rotation and progressive movement of the valve in the opposite direction from said neutral position the driven shaft is reversedly rotated with progressively increased speed.

7. A variable speed hydraulic clutch as set forth in claim 4 wherein said gear elements consist of a sun gear fixed to said driven shaft and a plurality of planet gears in mesh with said sun gear, and wherein said pumping means includes a pump body provided with cavities in which said sun and planet gears are rotatably mounted and including end plates on opposite sides of said body, and wherein said sun and planet gears are provided with centrally disposed circular recesses in their opposite ends to thereby reduce the drag torque of the clutch through resultant reduction of friction between the end faces of the gears and the inner faces of said end plates.

8. A hydraulic clutch as set forth in claim 3 wherein said coacting power-transmitting elements consist of a sun gear fixed to said driven shaft, a plurality of planet gears carried on said casing, a plurality of said ports communicating with said gears and providing a plurality of said fluid circuits and each circuit having an intake opening and a discharge opening extending through said valve seat; and wherein said fluid-circulating power-transmitting means includes a pump body having a thickness substantially equal to the width of said gears and is provided with cavities in which said sun and planet gears are rotatably mounted and end plates on opposite sides of said body, said sun and planet gears having centrally disposed circular recesses in their opposite ends to thereby reduce the drag torque of the clutch through resultant reduction of friction between the end faces of the gears and the inner faces of said end plates.

9. A hydraulic clutch adapted to be interposed between rotary power-driven means and a driven shaft, said clutch comprising a rotatable casing driven by said power-driven means and having a chamber therein partially filled with oil whereby, during the rotation of said casing, there is provided in said chamber an outer zone of oil and an inner central zone of air; fluid pumping means having component parts operatively connected with said casing and with said driven shaft; a cylindrical valve seat disposed in said zone of oil having fluid intake and discharge openings; a port circuit having fluid intake and discharge openings communicating with said pumping means and with said valve seat intake and discharge openings; a single cylindrical fluid control valve having a peripheral rim mounted for movement on said valve seat relatively to said valve seat intake and discharge openings for controlling flow of fluid into and out of said pumping means, said valve including an air passage disposed transversely to the axis of said valve having a permanently open air inlet opening within the zone of air and an air discharge opening within said rim, a separate exhaust fluid passage disposed transversely to the axis of said valve having an exhaust fluid inlet opening within said rim and a permanently open exhaust fluid discharge opening within the zone of air, said air passage discharge opening and said exhaust fluid inlet opening being axially spaced one from the other by an intermediate wall portion of the rim; and operating means disposed exteriorly of said casing, extending into said casing for operative connection with said valve and said valve being progressively movable in one direction from its neutral position by said operating means during rotation of said casing to a position whereat said air passage discharge opening has been moved completely out of registration with the inlet side of said port circuit to thereby arrest the flow of air thereinto and permit flow thereinto of only oil whereat said intermediate wall portion of said rim partially restricts the flow of the oil from said port circuit into said exhaust fluid passage, said valve being progressively further movable to a position whereat said intermediate wall portion of said rim has been moved to completely arrest the flow of oil from said port circuit while the inlet side of said port circuit is open to the inflow of oil directly from the zone of oil.

10. A variable speed hydraulic clutch adapted to be interposed between power-driven means and a driven shaft and comprising a rotatable casing operatively connected with said power-driven means and having a chamber therein partially filled with oil whereby, during the rotation of said casing, there is provided in said chamber an outer zone of oil and an inner central zone of air; power-transmitting means in said casing including a gear concentric with said driven shaft and a plurality of planet gears in mesh with said gear and a pair of ports communicating with each planet gear and providing a fluid circuit having an intake opening and a discharge opening both disposed within said zone of oil, said gear and said planet gears operatively connecting said casing with said driven shaft and in response to controlled flow of fluid in said port circuits adapted to control relative movement between said casing and said driven shaft; a cylindrical valve seat having a plurality of axially spaced fluid intake and discharge openings communicating with respectively said intake and discharge openings of said port circuits; an axially movable cylindrical valve having a peripheral rim movable on said valve seat relatively to said valve seat intake and discharge openings for controlling fluid flow therethrough into and out of said port circuits, said valve including a plurality of radially disposed air passages having permanently open air inlet openings within the zone of air and air discharge openings within said rim, a plurality of separate radially disposed exhaust fluid passages having exhaust fluid inlet openings within said rim and permanently open exhaust fluid discharge openings within the zone of air, said air passage discharge openings and said exhaust fluid passage inlet openings being axially spaced one from the other by an intermediate wall portion of the rim, said air passage discharge openings and said exhaust fluid passage inlet openings being of such widths axially of the valve and so axially spaced relatively one to the other and relatively to said valve seat intake and discharge openings that a progressive movement of the valve in one direction will control the flow of only air, or mixtures of relatively varied proportions of air and oil, or of only oil through said valve seat intake and discharge openings and through said port circuits of said power-transmitting means to thereby control the stationary position or relatively variable rotations of said driven shaft, said valve being axially movable in said one direction to a position whereat said intermediate wall portion of said rim completely arrests the discharge of the oil from said valve seat discharge openings while said valve seat intake openings are open to the inflow of oil directly from the zone of oil to thereby substantially synchronize the rotation of said driven shaft with the rotation of said casing.

11. A variable speed hydraulic clutch as set forth in claim 10 wherein said air passage discharge openings merge in said rim to constitute an annular air discharge passage on one side of said intermediate wall portion and wherein said exhaust fluid inlet openings merge in said rim to constitute an annular exhaust fluid discharge passage on the opposite side of said intermediate wall portion.

12. A variable speed hydraulic clutch as set forth in claim 10 and including an annular pressure-stabilizing port disposed between and communicating with all of the intake openings of said ports and all of the intake openings of said valve seat intake openings, and a separate annular pressure-stabilizing port disposed between and communicating with all of the exhaust fluid discharge openings of said ports and all of the exhaust fluid discharge openings of said valve seat, and wherein said air passage discharge openings merge in said rim to constitute an annular air discharge passage on one side of said intermediate wall portion and wherein said exhaust fluid inlet openings merge in said rim to constitute an annular exhaust fluid discharge passage on the opposite side of said intermediate wall portion.

13. A variable speed hydraulic clutch as set forth in claim 10 wherein said air passage discharge openings merge in said rim to constitute an annular air discharge passage on one side of said intermediate wall portion and wherein said exhaust fluid inlet openings merge in said rim to constitute an annular exhaust fluid discharge passage on the opposite side of said intermediate wall portion, and wherein the opposite side portions of the circular face of said intermediate wall portion of said rim are slightly beveled to impart slight pressure-responsiveness to the movement of the valve.

14. A hydraulic clutch as set forth in claim 9 wherein said valve is provided with an axially centrally disposed wall extending outwardly transversely to the axis of said valve from its inner centrally disposed circular periphery into integral formation with said intermediate wall portion of said rim, and a pair of side walls axially spaced from said centrally disposed transverse wall extending transversely to the axis of said valve outwardly from their inner centrally disposed circular peripheries and terminating in outer peripheral portions of said rim having peripheral faces axially spaced from the peripheral face of said intermediate wall portion, the diameters of the inner circular peripheries of said side walls being greater than the diameter of the inner circular periphery of said axially centrally disposed transverse wall, the annular space between said centrally disposed transverse wall and one of said walls constituting said air passage and the annular space between said centrally disposed transverse wall and the other one of said side walls constituting said exhaust fluid passage.

15. A hydraulic clutch as set forth in claim 9 wherein said valve is provided with an axially centrally disposed wall extending outwardly transversely to the axis of said valve from its inner centrally disposed circular periphery into integral formation with said intermediate wall portion of said rim, and a pair of side walls axially spaced from said centrally disposed transverse wall extending transversely to the axis of said valve outwardly from their inner centrally disposed circular peripheries and terminating in outer peripheral portions of said rim having peripheral faces axially spaced from the peripheral face of said intermediate wall portion, the diameters of the inner circular peripheries of said side walls being greater than the diameter of the inner circular periphery of said axially centrally disposed transverse wall, the annular space between said centrally disposed transverse wall and one of said walls constituting said air passage and the annular space between said centrally disposed transverse wall and the other one of said side walls constituting said exhaust fluid passage, and including a plurality of permanently open fluid passages extending axially of the valve transversely through said centrally disposed wall and through said side walls to provide open fluid communication with portions of said chamber at opposite ends of said valve, said open fluid passages being enclosed between their open ends in said side walls by wall portions extending through said air passage and through said exhaust fluid passage.

16. A hydraulic clutch as set forth in claim 10 wherein said valve is provided with an axially centrally disposed wall extending outwardly transversely to the axis of said valve from its inner centrally disposed circular periphery into integral formation with said intermediate wall portion of said rim, and a pair of end walls axially spaced from said centrally disposed transverse wall extending transversely to the axis of said valve outwardly from their inner centrally disposed circular peripheries and terminating in outer peripheral portions of said rim having peripheral faces axially spaced from the peripheral face of said intermediate wall portion, the diameters of the inner circular peripheries of said end walls being greater than the diameter of the inner circular periphery of said axially centrally disposed transverse wall, the space between said centrally disposed transverse wall and one of said end walls constituting said air passages and the space between said centrally disposed transverse wall and the other one of said end walls constituting said exhaust fluid passages, and including a plurality of permanently open fluid passages of triangular cross-section extending axially of the valve transversely through said centrally disposed wall and through said end walls to provide open fluid communication with portions of said chamber at opposite ends of said valve, said open fluid passages being enclosed between their open ends in said end walls by wall portions extending axially through said air passages and through said exhaust fluid passages.

17. A hydraulic clutch as set forth in claim 4 wherein said plurality of axially spaced valve seat intake and discharge openings are circularly arranged in a series of sets of openings of at least two different diameters to afford progressive metering of the flow of the air or oil, or mixtures thereof, therethrough into and out of said port circuits.

18. A hydraulic clutch as set forth in claim 10 wherein said plurality of axially spaced valve seat intake and discharge openings are circularly arranged in a series of sets of openings of at least two different diameters to afford progressive metering of the flow of the air or oil, or mixtures thereof, therethrough into and out of said port circuits, and wherein said valve seat is removably mounted in said chamber to permit interchange of same with other similar valve seats having intake and discharge openings of relatively different diameters to thereby afford variation of the control characteristics of the valve.

19. A variable speed hydraulic clutch as set forth in claim 9 wherein said air discharge opening and said exhaust fluid inlet opening in said rim are disposed in parallel planes which extend transversely to the axis of the valve and are axially equally spaced from a parallel plane intersecting the center of the annular face of said intermediate wall portion of said rim whereby the clutch casing and the driven shaft are adapted for reverse rotation operation and whereupon such reverse rotation and progressive movement of the valve in the opposite direction from said neutral position the driven shaft is reversedly rotated with progressively increased speed.

20. A hydraulic clutch as set forth in claim 9 wherein said valve is axially extended in length to provide an annular oil channel within said rim at each end of the valve, each of said annular oil channels being disposed between a pair of radially disposed annular rim wall portions, one of said rim wall portions constituting an annular wall defining one side of one of said openings for one of said passages which extend transversely to the axis of the valve and the other one of said rim wall portions constituting an annular end wall at one end of the valve, said end walls having a plurality of permanently open circularly spaced arcuate passages extending transversely therethrough whereby said annular oil channels are constantly filled with oil during the rotation of the clutch casing.

21. A reversibly rotatable hydraulic clutch adapted to be interposed as a variable speed power-transmitting coupling between a prime mover and a driven shaft and comprising a rotatable casing having a chamber therein partially filled with oil whereby, during the rotation of said casing, there is provided in said chamber an outer annular zone of oil and an inner central zone of air; a valve seat disposed within said zone of oil; fluid-circulating power-transmitting means within said casing including relatively movable elements carried on, and operatively connecting, said casing and said driven shaft, ports communicating with said elements and providing a fluid circuit having an intake opening and discharge opening, said intake and discharge openings being spaced apart and extending through said valve seat; a valve having a peripheral rim movable on said valve seat relatively to said seat intake and discharge openings and having an air passage provided with an air inlet opening within the zone of air and an air discharge opening within said rim and a separate exhaust fluid passage having an exhaust fluid inlet opening within said rim and an exhaust fluid discharge opening within said zone of air, said air passage discharge opening and said exhaust fluid inlet opening being separated by an intermediate wall portion of said rim and equally spaced from a plane disposed transversely to the axis of said valve and which plane intersects the center of the annular face of said intermediate wall portion of said rim; and operating means, actuable extraneously of the casing, extending into the casing for operative connection with said valve adapted, during the rotation of the casing, to progressively move said valve in one direction from its neutral position to thereby impart a progressively increased rotation to said driven shaft in a predetermined direction of rotation; said casing and said driven shaft being adapted for reverse rotation operation with movement of said valve by said operating means in the opposite direction from its said neutral position.

22. In a power-driven hydraulic clutch having a rotatable casing and fluid-circulating power-transmitting means, a cylindrical valve mounted within said casing for axial movement to control fluid circulation through said power-transmitting means for controlling and varying the speed and torque of a shaft driven by said clutch, said valve including a cylindrical rim; an axially centrally diametrically disposed intermediate wall integral with said rim and having a centrally disposed circular opening and a circular peripheral face intermediate the ends of said rim; a pair of diametrically disposed end walls axially spaced from said intermediate wall, terminating in peripheral portions of said rim, and each provided with a centrally disposed circular opening concentric with said circular opening in said intermediate wall, the space between said intermediate wall and one of said end walls constituting an air passage and the space between said intermediate wall and the other one of said end walls constituting an exhaust fluid passage; and separating means axially extending between said intermediate wall and said end walls and through said passages for retaining said end walls spaced apart distances from said intermediate wall.

23. In a power-driven hydraulic clutch as set forth in claim 22 wherein said separating means comprises a plurality of circuitous axially extending walls circumscribing fluid passages extending axially through said intermediate and end walls and having open ends within said end walls permitting axial movement of fluid through the valve.

24. In a power-driven hydraulic clutch as set forth in claim 23 wherein said central openings in said end walls are of a diameter greater than the diameter of the central opening in said intermediate wall.

25. In a power-driven hydraulic clutch having a rotatable casing provided with a chamber therein partially filled with oil whereby, during the rotation of said casing, there is provided in said casing an annular zone of oil and a central zone of air, including fluid-circulating power-transmitting means within said casing operatively connected to a driven shaft and having ports providing a plurality of fluid circuits with intake and discharge openings therefor disposed in a cylindrical valve seat, in combination with a single cylindrical valve mounted for axial movement on said valve seat and having a fluid-flow control rim disposed within said zone of oil, said valve having at least one radially disposed air intake passage extending from said zone of air to said rim and at least one radially disposed exhaust fluid passage extending from said rim into said zone of air, said air and exhaust fluid passages having respectively axially spaced discharge and intake openings adapted to communicate with said valve seat intake and discharge openings for controlling the flow of air, or of mixtures of air and oil, or of oil through said port circuits in response to the movement of said valve to thereby control and vary the speed and torque of said driven shaft.

26. In a power-driven hydraulic clutch having a rotatable casing provided with a chamber therein partially filled with oil whereby, during the rotation of the casing, there is provided in said casing an outer annular zone of oil and an inner central zone of air including fluid-circulating power-transmitting means within said casing operatively connected with a driven shaft and provided with ports constituting a plurality of fluid circuits having circularly spaced intake openings and circularly spaced discharge openings axially spaced from said intake openings, cylindrical fluid control valve means movably mounted within said casing and having a pair of axially spaced fluid-flow-control rim portions disposed within said zone of oil provided with at least one radially disposed air intake passage extending from said zone of air to one of said rim portions and at least one radially disposed exhaust fluid passage extending from the other one of said rim portions into said zone of air, said air and exhaust fluid passages having respectively axially spaced discharge and intake openings disposed within their corresponding rim portions adapted to communicate with respectively said axially spaced circuit intake and discharge openings for controlling the flow of air, or mixtures of air and oil, or of only oil through said port circuits in response to the movement of said fluid control valve means to thereby control and vary the speed and torque of the driven shaft.

27. Cylindrical fluid control valve means as set forth in claim 26 wherein said radial intake and exhaust passages are axially adjacently disposed and separated by a common radially disposed intermediate wall extending from the zone of air to said rim portions.

28. A hydraulic clutch interposed between rotatable power-driven means and a driven shaft comprising a rotatable casing having a chamber therein partially filled with oil whereby, during the rotation of the casing, there is provided in said chamber an outer annular zone of oil and an inner central zone of air; fluid-circulating power-transmitting means within said casing operatively connecting said casing and said driven shaft including ports providing fluid circuits each having an intake opening and a discharge opening spaced axially of said casing from said intake opening; valve supporting and guiding means within said casing containing said circuit intake and discharge openings; cylindrical valve means having axially aligned peripheral rim portions controlling fluid flow through said axially spaced intake and discharge openings movable on said valve supporting and guiding means relatively to said circuit intake and discharge openings, the intake control rim portion being provided with radially disposed air passages having permanently open air inlet openings within the zone of air and air discharge openings within said intake control rim portion, independent radially disposed exhaust fluid passages having inlet openings within said discharge control rim portion and permanently open exhaust fluid discharge openings within the zone of air, said air passage discharge openings and said exhaust fluid inlet openings being each defined by annular rim portions; and operating means extending into the casing for operative connection with said valve means actuable exteriorly of the casing during the rotation of the casing to progressively move said valve means to thereby impart a progressively increased speed to said driven shaft.

JOHN R. THOMAS.

REFERENCES CITED

The following references are of record in the file of this patent:

UNITED STATES PATENTS

| Number | Name | Date |
|---|---|---|
| 2,134,153 | Seyvertsen | Oct. 25, 1938 |
| 2,329,230 | Thomas | Sept. 14, 1943 |
| 2,420,305 | Donahew et al. | May 13, 1947 |